PHASING SYSTEM

Filed April 9, 1951

INVENTOR:

United States Patent Office
2,722,564
Patented Nov. 1, 1955

2,722,564

PHASING SYSTEM

Maynard D. McFarlane, Corona del Mar, Calif.

Application April 9, 1951, Serial No. 219,955

11 Claims. (Cl. 178—69.5)

This invention relates to improvements in the art of facsimile reproduction at one or more receiving stations of a facsimile or facsimiles of an original subject at a transmitting station. The improvements herein described comprise methods of and means for facilitating the synchronizing and framing or phasing of transmitting and receiving mechanisms adapted for use with facsimile systems.

In a facsimile or picture transmission system, it is necessary to make a record of received signals, and to record these signals in correct spatial relationship not only with respect to each other but also with respect to the boundaries of the subject. An object of this invention is to secure this correct relationship of recorded signals, and particularly the correct "framing" of the received facsimile, that is, the correct disposition of the elements thereof with respect to the border or "frame."

In facsimile or picture transmission systems having moving members, this framing may be achieved by a correct phasing of the moving parts, and an object of this invention is to secure framing by such phasing. Where the members are rotating, phase adjustments may be secured by changing the speed of rotation of one mechanism with respect to another to change the angular phase displacement until a desired phase relationship is established. An object of this invention is therefore to provide a method and means for changing the speed of a mechanism with respect to another in order to change a pre-existing phase relationship, and to continue the change in speed until a desired phase relationship is secured.

This invention has particular application to facsimile systems employing local synchronization, such as frequency standards at each individual station for maintaining the speed of several equipments the same, so that both transmitters and receivers are controlled from the said standards in such a way that the speeds of rotation are constant within certain definite limits. In order that errors of synchronization may not be apparent in the received facsimile, commercial systems adopting this method use standards which are accurate to within approximately one part in a million in order to achieve the necessary regulation. With such systems, auxiliary apparatus is necessary to secure framing, usually by securing a phase correspondence of rotating members, such as picture drums or cylinders. By local synchronization is meant the use of a local standard, or a single or interconnected alternating current power system, or the use of a separately transmitted frequency to effect the synchronization of the transmitting and receiving mechanisms by the use of synchronous machines operated by means independent of the signal communication circuit utilized for the transmission of the picture signal.

This is a continuation in part of my copending application Serial No. 458,223, filed September 14, 1942 (now Patent No. 2,556,970, dated June 12, 1951), for a Synchronizing System.

In the facsimile phasing systems known to the prior art, the phasing of the receiving mechanism was accomplished by slowing down the receiving mechanism by the operation of a friction clutch, or by interrupting the drive to the receiving motor until phase correspondence was achieved: and in some cases this operation was intermittent, as for example in one system where the power to the receiving motor was interrupted each revolution until the mechanisms were in phase. In contradistinction to this method of operating, the present invention contemplates driving the mechanism to be phased (usually the receiving mechanism) steadily at a speed different from the transmitter speed until the phasing is accomplished, and then changing the speed of the receiver to equal that of the transmitter. Preferably the receiver is run at a speed greater than the transmitter speed during the phasing operation, since then at the instant of resumption of normal speed the frictional and inertia forces are in opposition: if the receiver is running slower and has to be accelerated, this must then be done against the combined frictional and inertia loads.

The desired change in speed of the mechanism may be effected by a change in the frequency of the regenerative device or the local standard, while the synchronous motor is running synchronously with the frequency applied to it. For example, where an oscillator circuit is employed, means may be provided whereby the frequency of the oscillator may be increased or decreased so that the synchronous speed of the receiving motor may be changed for purposes of phasing. This change in speed may be accomplished by a switch mechanism which may change the tuning of the oscillator circuit so as to secure the speed variation. The operation of this switch may be manually controlled, or it may be conveniently performed by a relay.

An object therefore of this invention is to provide a facsimile phasing system in which the mechanisms are continuously driven at speeds which are not synchronous with each other, so that the relative phase is continuously changing, and then achieving a synchronous speed drive when the desired phase relationship is established. Other objects of this invention are set forth in the specification and shown in the annexed drawings, in which certain forms of the invention have been described by way of example. The invention is not however limited to the specific examples herein shown, these being here described and illustrated for the purpose of explaining the invention.

The accompanying drawings illustrate various modifications of the invention. In the drawings.

Figure 1:
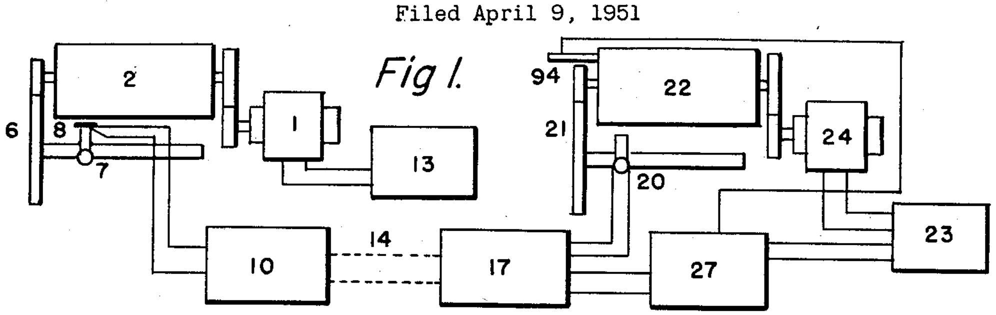
Figure 1 illustrates a facsimile system employing local synchronizing signals.

In Figure 1 is illustrated a facsimile system in which the synchronizing is by means of sources of local frequency which are of such standardization as to serve as independent synchronizing agencies, which may be controlled by a tuning fork, an oscillator, or any other equipment suitable for carrying out the desired control. In this figure the motor 1 drives the cylinder 2 adapted to carry the original picture or facsimile. The motor 1 by means of the mechanism 6 causes the photocell 8 and associated apparatus 7 to traverse the cylinder and thus effect the scansion of the original subject on the cylinder 2. The photocell output is amplified by the unit 10, which may include such filters, equalizers, etc. as may be deemed necessary, and is applied in the form of a desired signal wave to the communication channel 14. The speed of the motor 1, and hence the speed of the mechanical unit, is controlled by the unit 13, which may be a tuning fork, an oscillator, or other suitable equipment.

As shown in the figure, the signals in the channel 14 are amplified in the unit 17, which may include such filters and switching arrangements as may be required. A unit 23, which may be similar to the unit 13 at the transmitter, controls the speed of the receiving motor 24: the unit 27 may be used to vary the speed of the motor 24 to effect a desired phasing of the cylinder 22 with respect to the cylinder 2 to secure a correct framing of the received facsimile. The receiving cylinder 22, driven by the motor 24, drives the mechanism 21 to cause the optical unit 20 to scan the surface of the recording material on the cylinder 22. A brush 94, making contact with a partially conducting and partially insulating end segment of the cylinder 22 is connected to the unit 27 to permit sensing of the position of the cylinder.

Through the agency of the unit 27 a change of the output frequency of the unit 23 may be employed to speed up or slow down the receiving motor 24 while said motor is running synchronously with the frequency applied to it. For example, where an oscillator is employed in the unit 23, means may be provided whereby the frequency of the oscillator may be increased or decreased so that the speed of the motor 24 is changed for the purpose of phasing. This change in speed may be accomplished by a switch mechanism in the unit 27 effective to change the tuning of the oscillator circuit in the unit 23, thus changing the frequency of the applied power and thus the synchronous speed of the motor 24.

Figure 2:
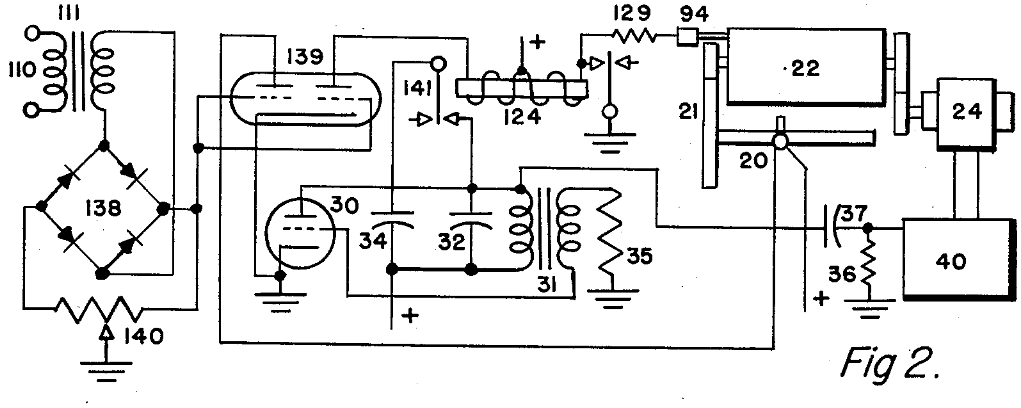
Figure 2 illustrates one form of speed changer adapted to be controlled by phasing signals.

In the circuit shown in Figure 2 the incoming signals on the line 110 are passed through the transformer 111, and thence to the rectifier 138, the output of which is applied to the two grids in parallel of the double triode 139, the bias of the grids being effected by the potentiometer 140. One triode of the tube 139 is arranged to apply picture signals to the recording device 20, while the other triode section of the tube 139 applies signals to the relay 124. The rectifier 138 and the right-hand section of the tube 139 are so arranged that the incoming signals are rectified and amplified so that the output of the tube circuit in the plate lead thereof comprises an inverted rectified signal envelope of the incoming signals in the line 110. For example, when for purposes of framing or phasing a picture transmission system, signals corresponding to the passage of a black bar in front of a photoelectric scanning member (or to the absence of picture signals occasioned by the passage of such a bar) as described in my above Patent No. 2,556,970 are produced in the input circuit 110 of the transformer 111, the corresponding output from the tube 139 may be in the form of an approximate square wave pulse, or in other words the plate current of the tube 139 is approximately cut off for a period corresponding to the period of the white signal at the transmitter and conducting for the time of passage of the black in front of the scanning photoelectric cell.

It is to be understood that the production of the signal is not limited to the passage of a black bar on a white surface under scansion: this particular device is used for the purpose of explaining the operation of the device, and because it is in practice a convenient method of obtaining the desired result. If desired, a cam interrupter (as illustrated in Patent No. 2,164,038) serving to interrupt the output from an oscillator, or an insulating segment in part of the rotating mechanism may be employed instead of the scanning system described. The photoelectric scanning means is a preferred form of the device.

The circuit from the plate of the right hand section of the double triode 139 passes to the left hand winding of the relay 124, and thence to the supply of positive potential. Another coil of the relay 124 is arranged as shown to be energized intermittently by means of current from the positive supply, through the right hand coil of the relay 124, the resistance 129, and the brush mechanism 94 to the cylinder 22, and thence to ground, so that the right hand coil of the relay 124 receives current when there is contact between the brush 94 and a conducting portion of the cylinder 22. This contact is so arranged that the current is passed at a predetermined point in the revolution of the cylinder 22 so as to secure phasing of the system by coincidence of the signal from the brush with the transmitted signal. In other words, if the framing impulse is sent out from the transmitter at the time of passage of the overlap or join of the original, as by means of the holding bar, then the brush 94 is arranged to make contact at the time that the overlap or join of the receiving surface is in front of the recording device 20.

The relay 124 is so arranged that current through either of the coils of the relay is insufficient to operate the armature or armatures of the relay 124, but that when current is passed through both coils the relay 124 is operated. Since the relay is only operated when current is passed simultaneously through both windings, the relay is only operated when the desired phase relationship is achieved, as evidenced by the arrival of currents in both coils at the same time.

The operation of the relay 124 causes the closing of the right hand contact, which passes current from the positive supply through the right hand coil of the relay. Since in the circuit including the brush 94 there is the series resistance 129, and since there is no resistance shown in the circuit through the relay contact, the values of the currents may be so balanced that current through the coil and contact is sufficient to hold the relay in its operated position, while the insertion of the resistance 129 allows the requirement to be met that the relay 124 shall be operated only when there is current in both coils. Thus the contact serves as a locking contact, and the relay remains locked in its operated position once it has been operated until the circuit is broken by turning off the power.

Operation of the relay 124 also closes the left hand contact 141 of the relay, which serves to change the frequency of the device which drives the motor 24. As soon as the relay is operated the speed of the motor is changed, and the speed remains at its new value until the circuit of the relay 124 is broken, since the relay is itself locked up by its right hand contact for the time during which the power remains on. The left hand portion of the double triode 139 passes the incoming signals in the line 110 after rectification in the device 138 to the recording device 20, which in this case may be a device suitable for operation on a rectified signal envelope, as a gas tube for example of the type known as Westinghouse WL761, and thus accomplishes the recording of the signal values on the surface of the material on the cylinder 22.

The motor 24 is driven by the amplifier 40, which may be any suitable form of audio amplifier adapted to handle the requisite power for the motor at the desired frequencies. A suitable amplifier for this purpose is described in the Radiotron Designer's Handbook (RCA Manufacturing Co., Harrison, N. J.), third edition, page 42, Figure 11. The input to the amplifier may be supplied in a variety of ways; as above stated the input may be from a tuning fork or any one of a number of types of oscillators. In the figure, by way of example, is shown a tuned plate oscillator circuit, with arrangements for varying the tuning of the oscillator and hence its frequency. As shown in the figure, the oscillator frequency is higher during the phasing period than during the recording period, for the reasons mentioned above: but it is to be understood that there is no limitation implied in this arrangement, and that the reverse operation may be secured if desired by a reversal of the relay connections.

In Figure 2 the tube 30 has the primary of the transformer 31 inserted in the plate lead between the anode and the source of potential. Across this transformer primary are disposed the capacitors 32 and 34, so arranged that with the capacitor 32 in circuit the oscillator will operate at one frequency (the phasing frequency) and with both capacitors 32 and 34 in parallel across the transformer the oscillator will operate at the other desired frequency (the transmitter frequency). Oscillation is produced through the connection of the grid of the tube 30 to the secondary of the transformer 31 as shown, the resistor 35 acting as a stabilizer. From the plate of the tube 30 an output to the amplifier 40 is taken by means of the capacitor 37 and resistor 36.

The left hand contacts 141 of the relay 124, which as above described performs the speed-changing operation, are arranged to change the frequency of the oscillator by changing the effective value of the capacity across the primary of the transformer 31. Thus, with the relay 124 in its unoperated position the transformer 31 is tuned by the capacitor 32, while the operation of the relay 124 inserts the capacitor 34 in parallel with the capacitor 32, so that the transformer 31 is tuned by the combination of the capacitors 32 and 34. Thus the frequency of the oscillator (and hence the speed of the motor 24) is higher while the relay 124 is unoperated, and drops when the relay pulls up. By moving the lead from the capacitor 34 from the front to the back contact 141 of the relay 124, this condition would be reversed. Conveniently the tube 139 is located in the unit 17 of Figure 1: the relay 124 and its associated parts in the unit 27: and the oscillator and amplifier in the unit 23.

At the start of a transmission the relay 124 is in its unoperated position. The unit 23 drives the motor 24 and cylinder 22 at a speed higher than the transmitter speed, under control of the oscillator tube 30. The brush 94 and its associated segment places a periodic pulse on the winding of the relay 124; and another periodic pulse at a different rate is applied from the transmitter through the circuit 110. When these two pulses coincide in time, the relay 124 is operated, the tuning of the oscillator is changed, and the speed of the motor is made substantially the same as the speed of the transmitter motor 1. The apparatus is then in synchronism and in phase with the transmitter and in a condition for recording by means of the signals applied to the device 20.

While for purposes of simplicity and to explain the invention, there has been illustrated an oscillator of the fundamental frequency of the motor drive, in many cases an oscillator frequency many times that of the final drive frequency is used, and electronic circuits are employed to extract a submultiple of the oscillator frequency for motor drive purposes. One such device is described in the Proceedings of the Institute of Radio Engineers, vol. 34, No. 10, October 1946, page 799. Such a device of itself does not form part of the present invention, but the principles of the invention may be applied to the device shown in the above-referenced article for the purpose of changing the output frequency by a change in the sub-harmonic factor used in extracting the operating frequency. For example, if a crystal oscillator of 180,000 cycles per second is employed as the system standard and normally this is subdivided by 3000 to produce 60 cycles per second for driving the motor 24, the relay 124 may be arranged in its unoperated position to select another submultiple (say division by 2900) of the high frequency to produce a different basic frequency for the phasing period (in this case, approximately 62 cycles per second) by changing the division ratio in the proportion of 29 to 30. The IRE paper above mentioned shows how a change of division ratio can be effected by a change in the value of a single resistor in the chain: to effect this change of resistor value the contacts of the relay 124 would be used to insert an additional resistor in the circuit as may be required in a similar manner to the use of the relay to change the capacity value in the case above described. Other methods of relay-controlled frequency change will be obvious to those skilled in the art, and the invention here disclosed is not limited to the forms actually described and illustrated, but the invention includes all forms applicable to the purposes of effecting a frequency change by circuit changes for effecting a motor speed change as described.

Figure 3:
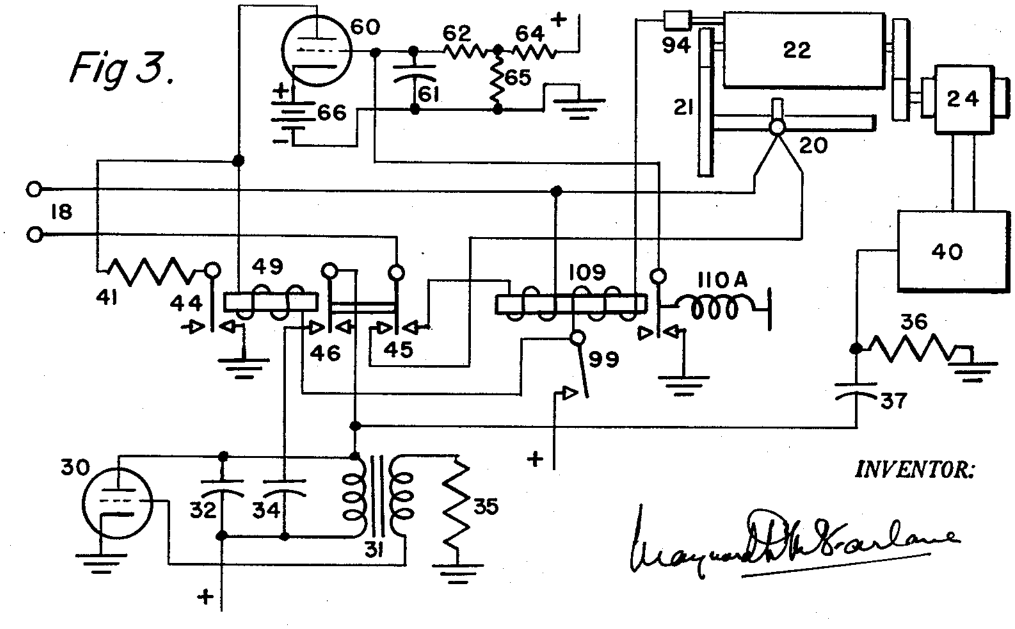
Figure 3 illustrates another form of speed changer operable with the local synchronizing source.

In the arrangement shown in Figure 3 the motor 24 drives the cylinder 22 and, through the gearing 21 the leadscrew and recording unit 20. Power is supplied to the motor 24 from the amplifier 40, which is itself supplied with a signal of the appropriate frequency from the oscillator tube 30. This tube 30 is arranged to oscillate at one of two frequencies, the particular frequency used at any instant being dependent on the state of the lock-up relay 49. This dual frequency condition is secured by the addition of the capacitor 34 to the circuit in parallel with the capacitor 32 to change the tuning of the oscillatory circuit and hence its frequency of oscillation. The additional capacity is added by the contacts 46 of the relay 49 when the relay is in its operated position: in this respect the relay 49 controls the frequency of the oscillator in the same way as the relay 124 controls the frequency of the circuit in Figure 2.

As described in conjunction with Figure 12 of my copending application Serial No. 458,223 (now Patent 2,556,970 dated June 12, 1951) above referred to, the brush 94 makes contact with the grounded cylinder 22 for all of the revolution of the cylinder except the portion corresponding to the underlap section. The spring 110A normally holds the armature of the relay 109 against its back contact, but current through the right hand winding of the relay from the positive source through the switch 99 to the brush 94 energises the relay and draws the armature into its operated position except for the time during which contact is broken at the brush 94; that is, except for the underlap period. The other winding of the relay 109 is energised through the back contact of the armature 45 of the relay 49 with incoming pulses from the line 18: these are the pulses corresponding to the passage of the underlap portion in front of the photoelectric cell at the transmitter; that is the time at which the black clamp bar passes in front of the scanner.

If the signal from the transmitter arrives at the receiver at a time at which the relay 109 is operated, it will have no effect on the relay. However, at the start of a transmitting sequence, the relay 49 is not energised, and the contact 46 is open, so that the oscillator tube 30 is operating at its higher frequency. Under these conditions the phase of the receiver cylinder 22 is continually changing with respect to the transmitter cylinder 2, so that eventually the impulse from the transmitter will arrive at a time when the local current through the brush 94 is not holding the relay 109 in its operated position, so that at that time the pulse from the circuit 18 holds the relay 109 in its operated position. The armature of the relay 109 does not fall back onto its back contact when the transmitter and receiver cylinders are in phase.

The armature of the relay 109 is connected to the grid of the tube 60. This tube is here shown as a triode, but it may be replaced by a thyratron if desired with the necessary conventional circuit changes. The grid of the tube 60 is also connected to an integrating circuit comprising the capacitor 61 and resistor 62, which is also connected to a positive potential source through the voltage divider comprising the resistors 64 and 65. The cathode of the tube 60 is biassed by the battery 66, so that the tube is normally biassed to cut-off. As the capacitor 61 is charged through the resistor 62 the bias is gradually removed from the tube 60 so that eventually the tube 60 will conduct: when this happens, the plate current of the tube passing through the winding of the relay 49 will energise this relay. The circuit 61, 62, 64 and 65 thus operates with the tube 60 to form a time-delay circuit of the operation of the relay 49.

However, since the back contact of the relay 109 is grounded, whenever the armature of the relay 109 reaches its back contact the capacitor 61 is grounded and discharged. Therefore the cycling of the time delay is started only at the time that the armature of the relay 109 leaves its back contact. By properly proportioning the time constant of the RC circuit on the grid of the tube 60 to the other circuit parameters the device may be arranged so that the tube 60 will not conduct sufficiently for the operation of the relay 49 during the time of one revolution of the cylinder 22, but that it will cause operation of the relay 49 in less than the time of two revolutions of the cylinder 22. Since the capacitor 61 is discharged at each revolution of the cylinder 22 except at the particular time at which the signal from the transmitter arrives at a time indicating correct phase relationship between transmitting and receiving cylinders, this is the only time at which the capacitor 61 will have sufficient charging time to cause the operation of the relay 49. Thus this operation of relay 49 will occur when, and only when, the cylinders 2 and 22 are in phase.

Operation of the relay 49 applies the signal circuit 18 to the recorder 20 through the armature 45: it changes the frequency of the oscillator tube 30 by adding the capacitor 34 across the tuned circuit by the operation of the armature 46: and it locks itself in its operated position through the armature 44 and the resistor 41. It is to be noted that if the tube 60 is a thyratron, the lock-up contact 44 is not required, since the tube itself will remain in a conducting state after firing, and hence the plate current will hold the relay 49 operated.

This structure is illustrative only, and alternative arrangements are possible. For example, if the brush of Figure 3 were arranged to make contact as it does in Figure 2, the right hand winding of relay 109 could be dispensed with; the brush circuit would be connected to the back contact of the relay 109 (removing the ground connection), and the same opertaional procedure would be established. Also other coincidence circuits may be used without departure from the spirit of the invention.

The operation of the circuit of Figure 3 is similar to that of Figure 2. The switch 99 is closed, the cylinders are rotating with cylinder 22 travelling faster than cylinder 2 because of the tuning of the oscillator tube 30. When the transmitted phasing signal arrives at a time indicating that the transmitter and receiver cylinders are in phase, the relay 49 is operated, the speed of the cylinder 22 is adjusted to that of the transmitter cylinder 2, the phasing operating mechanism is locked out of the circuit, and the recording operation is commenced.

Where in the specification and in the appended claims I refer to phasing or framing in connection with facsimile systems, it is to be understood that reference is made to that function of successful transmission and reception which requires that the borders of the received facsimile shall correspond with the borders of the original subject. And where I use the term "facsimile" it is to be understood that reference is made to all forms of such systems, including picture transmission systems, whether the subject matter to be transmitted and received be in the form of photographs, writing, printed matter, drawings, sketches, typescript, or other material.

And having described and illustrated certain forms of my invention for purposes of explaining its operation, it is to be understood that the scope of the invention is not limited to the actual examples shown, but that the invention comprises all such forms and variants thereof as are properly defined by the appended claims.

Having now described my invention, I claim:

1. In a facsimile receiver a source of stabilized recording frequency, means to change this frequency to a second stabilized value differing from the first value by a predetermined amount, means to select either frequency, a motor driving a mechanism, said motor being controlled in speed by said frequencies; a transmitted phasing signal, a local phasing signal, means to establish coincidence of said signals, means to select the second of said frequencies when coincidence does not exist, and to select the first of said frequencies upon coincidence, and means to lock out the frequency change means when coincidence has been achieved.

2. In a device of the class described a source of stabilized frequency, means to change this frequency to a different stabilized value, a motor driving a mechanism, said motor being controlled in speed by said frequency, a transmitted phasing signal, a local phasing signal complementary in duration with respect to a revolution of the mechanism to the transmitted signal, means to apply said signals to a control device inoperative when no break occurs in the combined signal, and means effective when the control device is operated by a break in the combined signal to effect a change in frequency.

3. In a facsimile receiver a source of alternating current power of a predetermined recording frequency, means to change said frequency to a second value, means to drive the receiver mechanism at a speed related to the applied frequency; a transmitter, a succession of phasing signals from said transmitter; means effective through the agency of said signals at the receiver for determining the existence of a phase error between the transmitter and receiver mechanisms; means effective when a phase error exists to change the frequency applied to the receiver to the said second value; and means to restore the recording frequency when correct phase relationship is established and to preclude subsequent frequency shift.

4. In a device of the class described a motor for driving a facsimile receiver at a speed related to the frequency applied to the motor windings; a source of frequency-controlled power for said motor; means to control the frequency of said source including a frequency determining network incorporating circuit elements; switching means associated with said network for changing the value of at least one element in said network to change the frequency output thereof; and means to control said switching means by a combination of transmitted and local phasing signals.

5. In a facsimile system a motor adapted to drive a receiver at a speed related to the frequency of the power source supplying energy to said motor; means to control the frequency of said source including a network incorporating circuit elements; switching means associated with said network adapted to change the value of at least one element in said network effective to change the frequency output of said source; received phasing signals from a remote transmitter; and means for controlling said switching device in accordance with the position of the receiving mechanism and the phasing signals in combination.

6. In a device of the class described a synchronous motor driven from an oscillator; a tuning element in said oscillator; switching means adapted to change the value of said tuning element effective to change the frequency of the oscillator and the speed of the motor; and means to energize said switching means under control of a combination of phasing indications.

7. In a facsimile system in transmitter driven at a substantially constant speed producing a succession of phasing signals at the start of a transmission and thereafter signals to be recorded; a receiver associated with said transmitter and adapted to receive said signals; means to drive said receiver at a speed synchronous with the transmitter speed during the recording operation and at a different speed during the phasing operation, each speed being determined by the frequency of the driving energy applied to the receiver in each case; switching means adapted to change the frequency of the receiver energy source; means to establish through the agency of said phasing signals transmitted from the transmitter when the receiver is in phase with the transmitter; means under control of said switching means effective when the mechanisms are not in phase to select the frequency which will bring the mechanisms into phase; means effective when the phasing signals establish that phase correspondence is achieved to select the recording frequency so that the receiver is driven at the recording speed; and means to prevent further operation of the switching means for the duration of the reception of the facsimile.

8. A device as claimed in claim 7 in which the switching means is a marginal relay operated by coincidence of local and transmitted signals.

9. A device as claimed in claim 7 in which the change in frequency is effected by switching in or out an element in the frequency-determining network of the source.

10. A device according to claim 9 in which the element switched is a capacitor in a tuned circuit establishing the frequency of the source.

11. A device as claimed in claim 7 in which the switching means is a relay operated by complementary signals from transmitter and receiver constituting a closed time cycle.

References Cited in the file of this patent

OTHER REFERENCES

| | | |
|---|---|---|
| 2,120,371 | Norrman | June 14, 1938 |
| 2,275,249 | Cooley | Mar. 3, 1942 |
| 2,399,421 | Artzt | Apr. 30, 1946 |
| 2,496,788 | Gillespie | Feb. 7, 1950 |
| 2,522,919 | Artzt | Sept. 19, 1950 |
| 2,538,547 | Young | Jan. 16, 1951 |
| 2,540,922 | Wickham | Feb. 6, 1951 |
| 2,556,970 | McFarlane | June 12, 1951 |